United States Patent
Dow et al.

(10) Patent No.: US 8,904,018 B2
(45) Date of Patent: Dec. 2, 2014

(54) BROWSER START PAGES BASED ON REMOTE CONTENT

(75) Inventors: Barry N. Dow, Hampshire (GB); Jonathan Limburn, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/364,122

(22) Filed: Feb. 1, 2012

(65) Prior Publication Data

US 2013/0198260 A1    Aug. 1, 2013

(51) Int. Cl.
G06F 15/16     (2006.01)
H04L 29/08     (2006.01)
G06Q 10/06     (2012.01)

(52) U.S. Cl.
CPC ........ G06Q 10/063114 (2013.01); H04L 67/22 (2013.01)
USPC .......................................... 709/228; 709/217

(58) Field of Classification Search
CPC .................. G06F 15/16; G06Q 10/06; G06Q 10/063114; H04L 12/1831; H04L 12/5855; H04L 67/22
USPC ........................... 709/217, 223, 228; 705/7.13
See application file for complete search history.

(56) References Cited

U.S. PATENT DOCUMENTS

| | | | |
|---|---|---|---|
| 5,745,681 A * | 4/1998 | Levine et al. | 709/200 |
| 6,430,739 B1 | 8/2002 | Ballard | |
| 7,594,013 B2 | 9/2009 | Wang et al. | |
| 8,516,062 B2 * | 8/2013 | Killoran et al. | 709/206 |
| 2002/0156787 A1 | 10/2002 | Jameson et al. | |
| 2004/0198320 A1 * | 10/2004 | Cheng et al. | 455/411 |
| 2005/0027605 A1 * | 2/2005 | Chen et al. | 705/26 |
| 2005/0165903 A1 | 7/2005 | Doan et al. | |
| 2007/0299938 A1 | 12/2007 | Chandra | |
| 2010/0114914 A1 | 5/2010 | Gerges et al. | |

FOREIGN PATENT DOCUMENTS

| | | |
|---|---|---|
| EP | 1239378 A2 | 9/2002 |
| EP | 1239378 A3 | 5/2006 |
| JP | 2002150031 A | 5/2002 |

OTHER PUBLICATIONS

"Dynamic display of browser home page, based upon browser history and scheduled events" [online] IP.com Prior Art Database. IPCOM000201843D. Published on Nov. 26, 2010. URL: http//ip.com/IPCOM/000201843.

* cited by examiner

*Primary Examiner* — Brian J Gillis
(74) *Attorney, Agent, or Firm* — Ronald Kaschak; Reza Sarbakhsh

(57) ABSTRACT

A server computer receives a user identifier from a user computer web browser program. The server computer identifies one or more uncompleted tasks associated with the user identifier that can be completed from the user computer via the user computer web browser program. The server computer then transmits to the user computer one or more universal resource locators (URLs) associated with the one or more uncompleted task, and the user computer provides access to the web pages referenced by the one or more URLs via the user computer web browser program. In certain embodiments, the server computer identifies the one or more uncompleted tasks by accessing a database that includes uncompleted tasks by user identifier and a URL associated with each uncompleted task. In other embodiments, the server updates the database when an uncompleted task associated with a user identifier is completed.

9 Claims, 3 Drawing Sheets

US 8,904,018 B2

BROWSER START PAGES BASED ON REMOTE CONTENT

FIELD OF THE INVENTION

The present invention relates generally to web browsers, and more particularly to displaying web browser start pages based on user-related content in a remote database.

BACKGROUND

Many business enterprises maintain websites that are designed specifically to support an enterprise's business activities. These websites can host content that includes informational content directed to current and potential customers, online customer order entry applications, and other applications directed to customer interactions. Enterprise websites can also host information and applications directed to the enterprise's employees. For example, an enterprise may maintain an internal website that includes information related to the enterprise's business strategies, internal development documents, personnel policies, etc. The internal website may also include information related to activities or tasks employees are assigned to complete. For example, all employees of the enterprise may be assigned to complete a training course related to export regulations, or employees of a certain division may be assigned to complete a training course related to products developed by the division. Enterprises often have systems in place to send out email reminders to employees who have not completed assigned tasks and courses by associated due dates.

The use of web browsers is commonplace in the business environment, partly as a result of the popularity of internal enterprise websites. Popular web browsers include Firefox by Mozilla Corporation, Internet Explorer by Microsoft Corporation, Chrome by Google Inc., and Safari by Apple Inc. A feature that is available in almost all web browsers is the ability to open multiple tabs in a single browser window. This feature allows the user to open multiple web pages within a single instance of a web browser without having to open a new browser window for each web page. In addition, the feature allows the user to easily switch between open web pages by selecting among the browser tabs. A web browser can also open a browser tab based on information contained in web pages received by the web browser. For example, certain HTML (hypertext markup language) and JavaScript statements in a web page received by a web browser can cause a new tab to be opened in the web browser.

SUMMARY

Embodiments of the present invention provide a system, method, and program product to determine a user computer web browser start page. A server computer receives a user identifier from a user computer web browser program. The server computer identifies one or more uncompleted tasks associated with the user identifier adapted for completion from the user computer via the user computer web browser program. The server computer then transmits to the user computer one or more universal resource locators (URLs) associated with the one or more uncompleted task, and the user computer provides access to at least one web page referenced by the one or more URLs via the user computer web browser program.

In certain embodiments, the server computer identifies the one or more uncompleted tasks by accessing a database that includes uncompleted tasks by user identifier and a URL associated with each uncompleted task. In other embodiments, the server computer updates the database to indicate the completion of an uncompleted task associated with a user identifier.

DETAILED DESCRIPTION

Embodiments of the present invention will now be described in detail with reference to the accompanying drawings.

Figure 1:
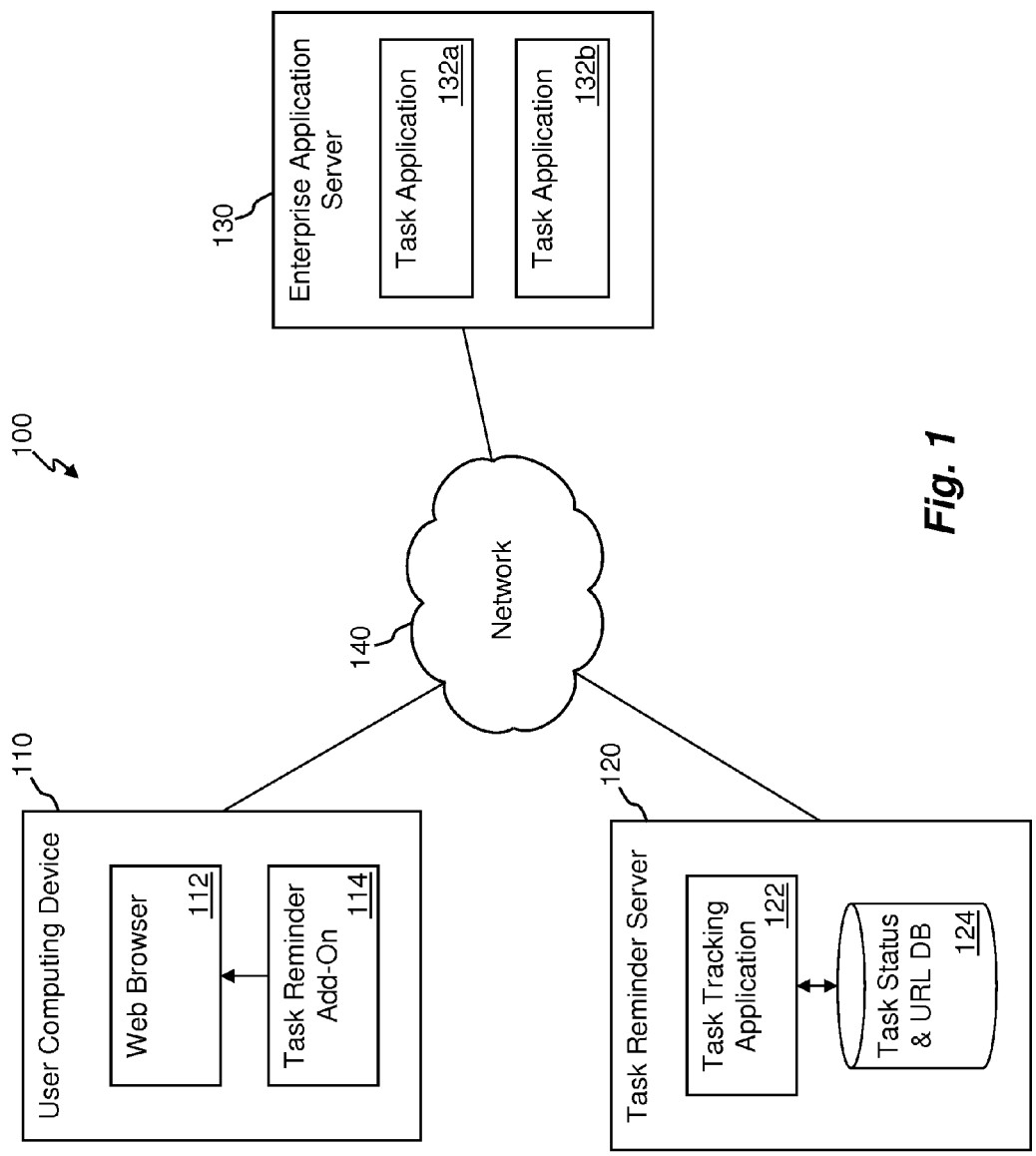
FIG. 1 is a functional block diagram illustrating an assigned task start page system in accordance with an embodiment of the present invention.

FIG. 1 is a functional block diagram illustrating an assigned task start page system 100 in accordance with embodiments of the present invention. Assigned task start page system 100 includes user computing device 110, task reminder server 120, and enterprise application server 130, all interconnected over a network 140.

In the preferred embodiment, network 140 includes at least a private enterprise network, or intranet, to which user computing device 110, task reminder server 120, and enterprise application server 130 are connected. The intranet can have connectivity to the Internet via, for example, a gateway device. Network 140 can be, for example, an intranet, a local area network (LAN), a wide area network (WAN) such as the Internet, and include wired, wireless, or fiber optic connections. In general, network 140 can be any combination of connections and protocols that will support communications between user computing device 110, task reminder server 120, and enterprise application server 130 over one or more networks that may include one or more private networks as well a public network, such as the Internet, in accordance with an embodiment of the invention.

In the preferred embodiment, enterprise application server 130 hosts task applications associated with tasks assigned to be performed by some or all of an enterprise's employees, and are accessed over network 140 via a user computer web browser, for example, web browser 112. For example, task application 132a residing on enterprise application server 130 may be on online training course associated with certain education requirements that certain enterprise employees are assigned to complete by a specific due date. Similarly, task application 132b also residing on enterprise application server 130 may provide access to certain employment forms that certain enterprise employees are assigned to complete and submit by a specific due date. In the preferred embodiment, task applications 132a and 132b are web-based applications that are accessed by user computing devices, for example, user computing device 110, over network 140. Each task application 132a and 132b is accessible over network 140 via a uniform resource locator (URL) address, and each is coded such that a user of a computing device, for example, user computing device 110, can access the applications via a web browser, for example, web browser 112, over network 140. For example, task applications 132a and 132b may include a user interface webpage coded in HTML and JavaScript that is transmitted via network 140 to web browser 112 on user computing device 110. In general, task applications 132a and 132b represent any application or applications associated with tasks assigned of an enterprise employee that include a web-based interface supported by a web browser installed on the enterprise employee's computing device.

Enterprise application server 130, in general, represents any network server or servers capable of hosting web-based applications that are accessible to employees of the enterprise over a network, such as network 140. Enterprise application server 130 can be a laptop computer, desktop computer, specialized computer server, or any other computer system known in the art. In certain embodiments, enterprise application server 130 represents computer systems utilizing clustered computers and components to act as a single pool of seamless resources when accessed through a network, such as a LAN, WAN, or a combination of the two. This implementation may be preferred for data centers and for cloud computing applications. In general, enterprise application server 130 can be any programmable electronic device as described in further detail with regard to FIG. 3 or combination of such devices.

In the preferred embodiment, task reminder server 120 performs two main functions: (1) to maintain information by enterprise employee of uncompleted assigned tasks; and (2) to send reminder information to enterprise employees concerning these uncompleted tasks in the form of web pages that provide access to the task applications associated with the uncompleted tasks. Task reminder server 120 includes task tracking application 122 and associated task status and URL database 124. In a preferred embodiment, task tracking application 122 maintains task status and URL database 124, which contains information by enterprise employee user ID of assigned web-based tasks that have not yet been completed by the employee, the task completion due dates, and the URLs of the task applications. In a preferred embodiment, task reminder server 120 is an enterprise central repository of assigned task status information that is populated and maintained automatically by various personnel and other departmental systems. For example, an enterprise may have a legacy system in place that tracks the completion status of a particular set of assigned tasks, for example, tasks related to human resources issues, and sends reminder emails to employees who are nearing or have passed a task completion due date. In this example, an interface can be developed to allow the legacy system to populate task status and URL database 124, via task tracking application 122, with information related to assigned but uncompleted tasks, including completion deadlines and task URLs. When an employee completes an assigned task, the legacy system updates task status and URL database 124 by, for example, causing the status record relating to the uncompleted task to be deleted.

In general, with regard to the first function that task reminder server 120 performs, task tracking application 122 and task status and URL database 124 can be any suitable system that will track the status of uncompleted tasks assigned to an enterprise employee, and the task application URL associated with each uncompleted assigned task. Task tracking application 122 and task status and URL database 124 can represent a separate system operated for the express purpose just stated, or represent functionality distributed among one or more enterprise systems, including legacy systems, that satisfies the requirements of embodiments of the present invention.

In the preferred embodiment, the second main function that task reminder server 120 performs is to send reminder information to enterprise employees, in the form of web pages transmitted to web browsers, having an approaching or delinquent task completion due date. For example, as described in more detail below, when web browser 112 is initiated, it may transmit a user ID to task tracking application 122. Task tracking application 122 receives the user ID and determines, based on information contained in task status and URL database 124, if the enterprise employee associated with the user ID is approaching the task completion due date of an uncompleted web-based task. If so, task tracking application 122 will generate and transmit information in markup language code, for example, HTML or JavaScript code, to the web browser 112 of the employee's computing device 110. The transmitted HTML or JavaScript code includes the URL of the uncompleted task, and will cause web browser 112 to open the web page referenced by the URL in a new tab of the web browser window. In other embodiments, the HTML or JavaScript code generated and transmitted by task tracking application 122 can, for example, cause web browser 112 to display a web page containing the URL links to one or more task applications 132 relating to uncompleted web-based tasks. In still other embodiments, the HTML or JavaScript code generated and transmitted by task tracking application 122 can, for example, cause web browser 112 to also open an alert box, pop-up window, or display a webpage page banner having an informational message relating to the one or more uncompleted web-based tasks. In general, with regard to this second main function that task reminder server 120 performs, the markup language code that task tracking application 122 generates and sends can be any code that will cause the receiving web browser to open a new browser tab or window that provides direct access to the task application associated with the uncompleted assigned task, or indirect access, such as links, to the task applications.

Task reminder server 120 can be a standalone network server, or represent functionality integrated into one or more network systems. In general, task reminder server 120 can be a laptop computer, desktop computer, specialized computer server, or any other computer system known in the art. In certain embodiments, task reminder server 120 represents computer systems utilizing clustered computers and components to act as a single pool of seamless resources when accessed through a network, such as a LAN, WAN, or a combination of the two. This implementation may be preferred for data centers and for cloud computing applications. In general, task reminder server 120 can be any programmable electronic device as described in further detail with regard to FIG. 3 or combination of such devices.

In the preferred embodiment, user computing device 110 operates to connect to network 140, and to execute web browser 112 which provides an interface to web-based task applications 132 over network 140. User computing device 110 includes a web browser 112 and an associated task reminder add-on 114, referred to hereafter as add-on 114. In the preferred embodiment, add-on 114 is an installed extension to web browser 112. When web browser 112 is initiated on user computing device 110, add-on 114 is invoked. In the preferred embodiment, add-on 114 determines if user computing device 110 is connected to at least the enterprise private network portion of network 140. If so, add-on 114 transmits a user ID associated with user computing device 110 to task tracking application 122. The user ID can be stored, for example, in a persistent web browser cookie, or as a value associated with add-on 114 when the add-on was installed. By determining if user computing device 110 is connected to the enterprise private network portion of network 140, a certain degree of security can be maintained. In certain embodiments in which network 140 does not include a private network, this step will not be performed. If task tracking application 122 determines that there are uncompleted assigned tasks associated with the transmitted user ID, the task tracking application will generate and transmit to web browser 112 markup language code that includes the URLs of the task applications 132 associated with the uncompleted assigned tasks. Web browser 112 will receive the transmitted markup language code and, depending on the specific instructions contained in the markup language code, will open new browser tabs or windows providing direct access to applications 132, or open a new browser tab or window displaying links to task applications 132. In certain embodiments, add-on 114 will transmit the user ID associated with user computing device 110 the first time only that web browser 112 is initiated in a day.

Figure 2:
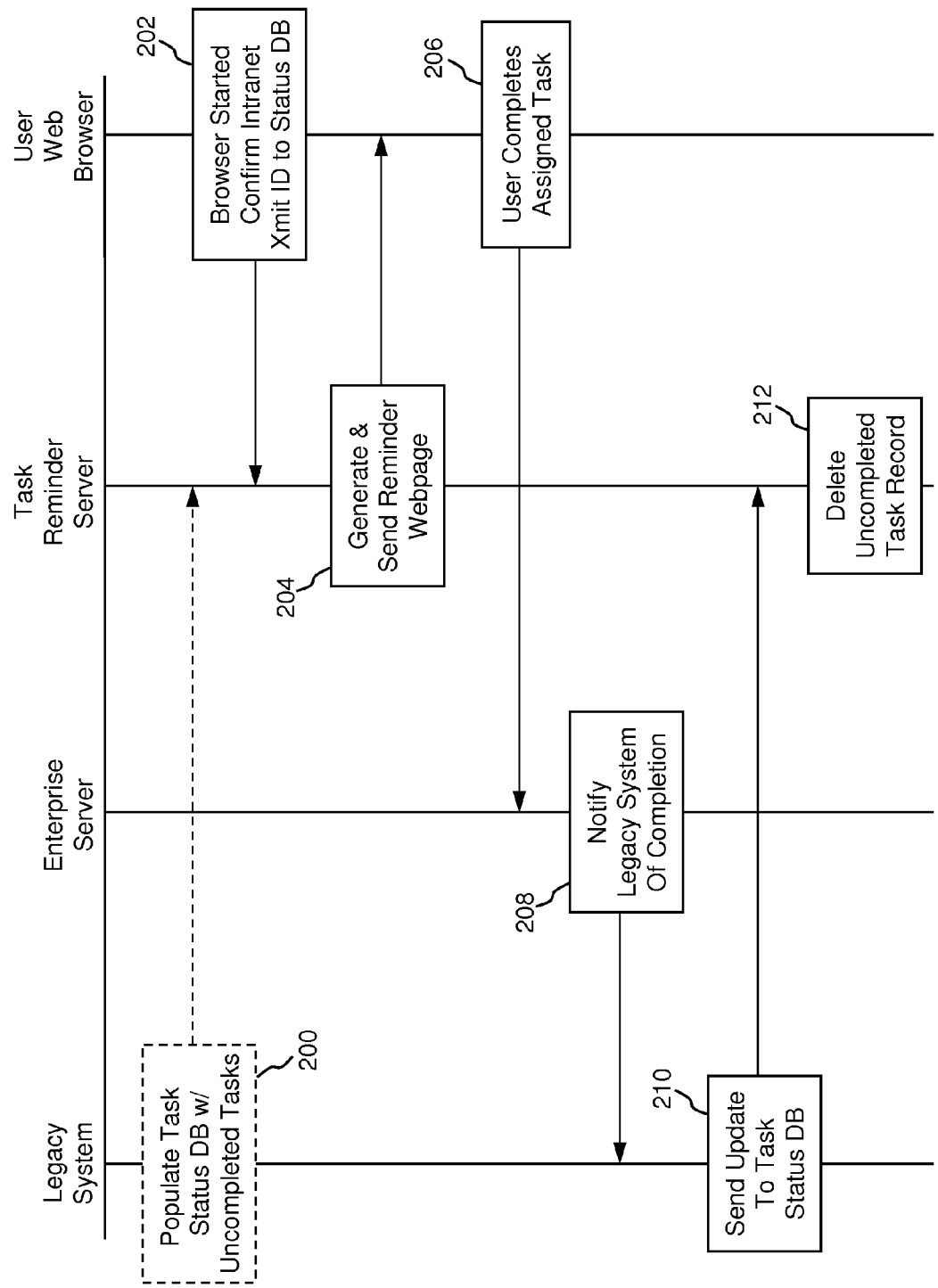
FIG. 2 is a message-flow diagram illustrating the interactions between components of the assigned task start page system of FIG. 1 in accordance with an embodiment of the present invention.

FIG. 2 is a message-flow diagram illustrating the interactions between the components of an assigned task start page system 100 in accordance with an exemplary preferred embodiment of the present invention. At 200, task status and URL database 124 is initially populated with uncompleted assigned task information by user ID. This information also includes the URLs of task applications 132 that are associated with the uncompleted tasks. Although the embodiment illustrated in FIG. 2 indicates that the information to initially populate task status and URL database 124 originates from the enterprise's legacy systems, the information can be generated from anywhere within or outside of the enterprise. Initially populating task status and URL database 124 is typically a one-time task, as indicated by dashed lines used to depict this message flow in FIG. 2. This task can be completed when assigned task start page system 100 is first installed and ready for use, and can be completed periodically or as needed as part of a database maintenance function.

At 202, after web browser 112 has been initiated and add-on 114 has confirmed that user computing device 110 is connected to at least the enterprise private intranet portion of network 140, the add-on transmits the user ID associated with the user computing device to task tracking application 122 on task reminder server 120.

At 204, after task tracking application 122 has determined, based on information contained in task status and URL database 124, that there are uncompleted assigned tasks associated with the user ID received from add-on 114, the task tracking application generates and transmits markup language code that includes the URLs of task applications 132 associated with the uncompleted tasks, to web browser 112.

At 206, web browser 112 opens one or more tabs or windows to provide direct or indirect access to task applications 132 on enterprise application server 130 associated with the uncompleted assigned tasks, and the enterprise employee completes the assigned tasks.

At 208, task applications 132 notify the enterprise's legacy system that the assigned tasks are completed. At 210, the legacy system notifies task tracking application 122 that the assigned tasks are completed, and at 212, the task tracking application updates task status and URL database 124 by, for example, deleting the uncompleted assigned task records associated with the user ID.

Figure 3:
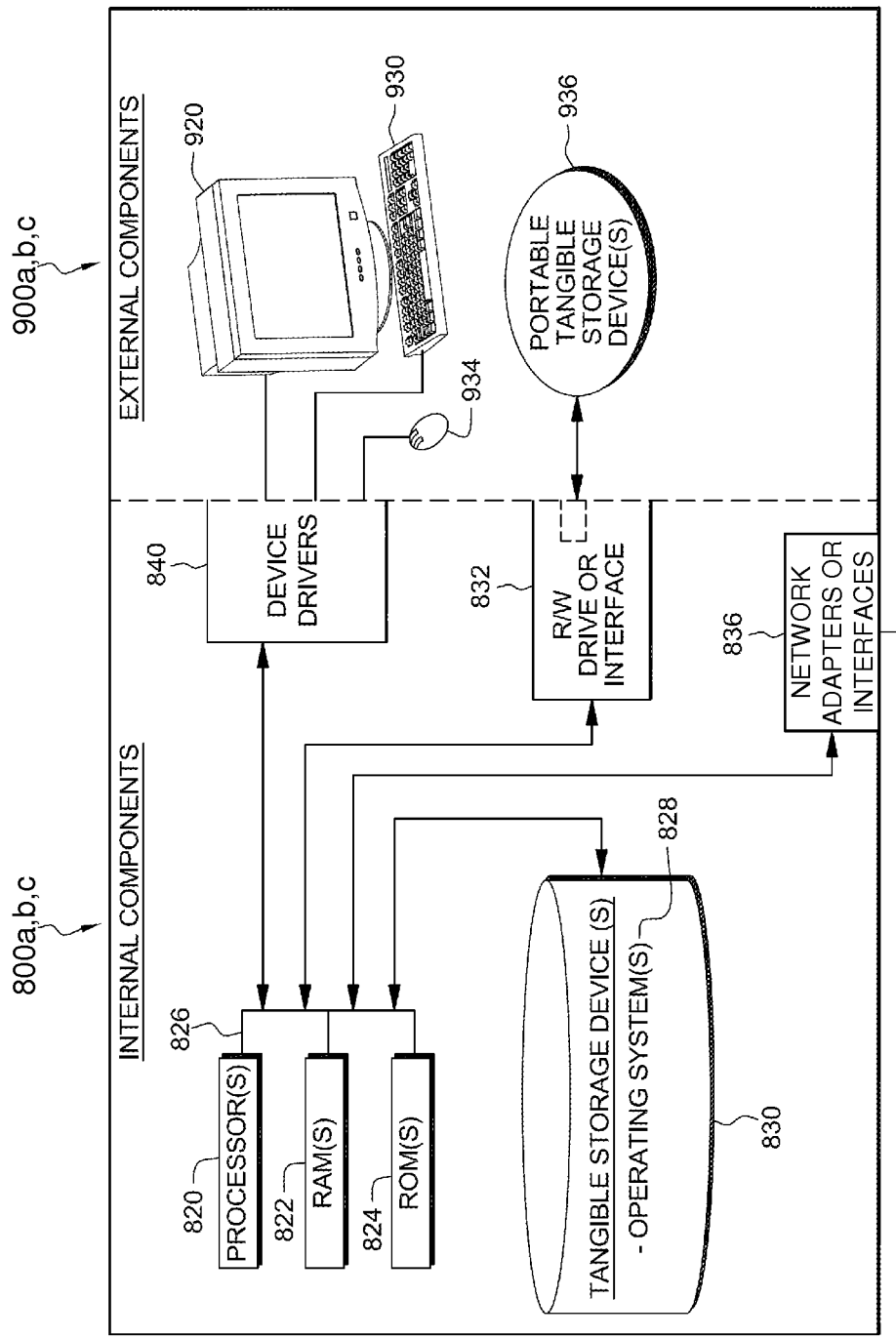
FIG. 3 is a block diagram of hardware and software within the computers of FIG. 1 in accordance with an embodiment of the present invention.

FIG. 3 shows a block diagram of the components of a data processing system 800, 900, such as user computing device 110, task reminder server 120, or enterprise application server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing device 110, task reminder server 120, or enterprise application server 130 include respective sets of internal components 800 a, b, c and external components 900 a, b, c illustrated in FIG. 3. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 112 and 114 in user computing device 110; program 122 in task reminder server 120; and programs 132 in enterprise application server 130 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 112 and 114 in user computing device 110; program 122 in task reminder server 120; and programs 132 in enterprise application server 130 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. The programs 112 and 114 in user computing device 110; program 122 in task reminder server 120; and programs 132 in enterprise application server 130 can be downloaded to respective computers 110, 120, and 130 from an external computer via a network (for example, the Internet, a LAN, or WAN) and respective network adapters or interfaces 836. From the network adapters or interfaces 836, programs 112 and 114 in user computing device 110; program 122 in task reminder server 120; and programs 132 in enterprise application server 130 are loaded into the respective hard drive 830. The network may comprise copper wires, optical fibers, wireless transmission, routers, firewalls, switches, gateway computers and/or edge servers.

Each of the sets of external components 900 *a, b, c* can include a computer display monitor 920, a keyboard 930, and a computer mouse 934. External components 900 *a, b, c* can also include touch screens, virtual keyboards, touch pads, pointing devices, and other human interface devices. Each of the sets of internal components 800 *a, b, c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or message-flow diagrams of methods, apparatus (system), and computer program products according to embodiments of the invention. It will be understood that each block of the message-flow diagrams and/or block diagrams, and combinations of blocks in the message-flow diagrams and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a LAN or WAN, or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method to determine a user computer web browser start page, the method comprising the steps of:
    a server computer receiving a user identifier from a user computer web browser program upon startup of the web browser program and prior to the web browser program transmitting any universal resource locator (URL), wherein the server computer determines that the user computer is connected to at least an enterprise private intranet portion of a network;
    the server computer identifying one or more uncompleted tasks associated with the user identifier, adapted for completion from the user computer via the user computer web browser program; and
    the server computer transmitting to the user computer one or more URLs associated with the one or more uncompleted tasks, wherein the user computer provides access to at least one web page referenced by the one or more URLs via the user computer web browser program.

2. A method in accordance with claim 1, wherein the step of the server computer identifying one or more uncompleted tasks further comprises the server computer accessing a database that includes the one or more uncompleted tasks by user identifier, and a URL associated with each uncompleted task.

3. A method in accordance with claim 2, further comprising the step of updating the database to indicate completion of one of the one or more uncompleted tasks associated with a user identifier.

4. A computer program product to determine a user computer web browser start page, the computer program product comprising:
    one or more non-transitory computer-readable storage devices and program instructions stored on at least one of the one or more non-transitory computer-readable storage devices, the program instructions comprising:
    program instructions to receive a user identifier from a user computer web browser program upon startup of the web browser program and prior to the web browser program transmitting any universal resource locator (URL), and to determine that the user computer is connected to at least an enterprise private intranet portion of a network;
    program instructions to identify one or more uncompleted tasks associated with the user identifier, adapted for completion from the user computer via the user computer web browser program; and
    program instructions to transmit to the user computer one or more URLs associated with the one or more uncompleted tasks, wherein the user computer provides access to at least one web page referenced by the one or more URLs via the user computer web browser program.

5. A computer program product in accordance with claim 4, wherein the program instructions to identify one or more uncompleted tasks further comprise program instructions to access a database that includes the one or more uncompleted tasks by user identifier, and a URL associated with each uncompleted task.

6. A computer program product in accordance with claim 5, further comprising program instructions to update the database to indicate completion of one of the one or more uncompleted tasks associated with a user identifier.

7. A computer system to determine a user computer web browser start page, the computer system comprising:
    one or more processors, one or more computer-readable memories, one or more non-transitory computer-readable storage devices, and program instructions stored on at least one of the one or more storage devices for execution by at least one of the one or more processors via at least one of the one or more memories, the program instructions comprising:
    program instructions to receive a user identifier from a user computer web browser program upon startup of the web browser program and prior to the web browser program transmitting any universal resource locator (URL), and to determine that the user computer is connected to at least an enterprise private intranet portion of a network;
    program instructions to identify one or more uncompleted tasks associated with the user identifier, adapted for completion from the user computer via the user computer web browser program; and
    program instructions to transmit to the user computer one or more URLs associated with the one or more uncompleted tasks, wherein the user computer provides access to at least one web page referenced by the one or more URLs via the user computer web browser program.

8. A computer system in accordance with claim 7, wherein the program instructions to identify one or more uncompleted tasks further comprise program instructions to access a database that includes the one or more uncompleted tasks by user identifier, and a URL associated with each uncompleted task.

9. A computer system in accordance with claim 8, further comprising program instructions to update the database to indicate completion of one of the one or more uncompleted tasks associated with a user identifier.

\* \* \* \* \*